US012239998B2

(12) United States Patent
Park

(10) Patent No.: US 12,239,998 B2
(45) Date of Patent: Mar. 4, 2025

(54) ELECTRIC PRECIPITATOR

(71) Applicant: Hanon Systems, Daejeon (KR)

(72) Inventor: Ji-Yong Park, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 467 days.

(21) Appl. No.: 17/629,215

(22) PCT Filed: Aug. 13, 2020

(86) PCT No.: PCT/KR2020/010744
§ 371 (c)(1),
(2) Date: Jan. 21, 2022

(87) PCT Pub. No.: WO2021/029696
PCT Pub. Date: Feb. 18, 2021

(65) Prior Publication Data

US 2022/0250088 A1 Aug. 11, 2022

(30) Foreign Application Priority Data

Aug. 13, 2019 (KR) ........................ 10-2019-0099042

(51) Int. Cl.
*B03C 3/08* (2006.01)
*B03C 3/12* (2006.01)
(Continued)

(52) U.S. Cl.
CPC .................. *B03C 3/08* (2013.01); *B03C 3/12* (2013.01); *B03C 3/38* (2013.01); *B03C 3/47* (2013.01); *B03C 3/66* (2013.01)

(58) Field of Classification Search
CPC .... B03C 3/41; B03C 3/47; B03C 3/45; B03C 3/12; B03C 3/08; B03C 3/38; B03C 3/40;
(Continued)

(56) References Cited

U.S. PATENT DOCUMENTS 2,978,066 A * 4/1961 Nodolf ...................... B03C 3/45 96/87
4,231,766 A * 11/1980 Spurgin .................... B03C 3/36 361/230

(Continued)

FOREIGN PATENT DOCUMENTS

CN 1262631 A 8/2000
JP H06254437 A * 9/1994

(Continued)

OTHER PUBLICATIONS

Office Action issued on Mar. 6, 2024 by the CIPO in the corresponding Patent Application No. 202080057443.8, with English translation.

(Continued)

*Primary Examiner* — Christopher P Jones
(74) *Attorney, Agent, or Firm* — NORTON ROSE FULBRIGHT US LLP

(57) ABSTRACT

The present invention relates to an electric precipitator which adsorbs and filters fine dust included in air from air conditioning apparatuses such as an air conditioner or an air purification apparatus, wherein an electric charging part and a precipitating part to which high voltage is applied do not adversely affect each other and may increase precipitation efficiency.

12 Claims, 12 Drawing Sheets

(51) Int. Cl.
*B03C 3/38* (2006.01)
*B03C 3/47* (2006.01)
*B03C 3/66* (2006.01)

(58) Field of Classification Search
CPC .... B03C 3/60; B03C 3/66; B03C 3/70; B03C 3/06; B03C 3/04; B03C 2201/04; B03C 2201/06; B03C 2201/08; B03C 2201/10
See application file for complete search history.

(56) References Cited

U.S. PATENT DOCUMENTS

| | | | | | |
|---|---|---|---|---|---|
| 4,264,343 | A * | 4/1981 | Natarajan | B03C 3/78 | 96/48 |
| 4,313,741 | A * | 2/1982 | Masuda | B03C 3/60 | 96/78 |
| 4,673,416 | A * | 6/1987 | Sakakibara | B03C 3/66 | 96/79 |
| 5,055,118 | A * | 10/1991 | Nagoshi | B03C 3/60 | 96/99 |
| 6,251,171 | B1 * | 6/2001 | Marra | B03C 3/60 | 96/96 |
| 6,749,669 | B1 * | 6/2004 | Griffiths | B03C 3/28 | 96/99 |
| 7,014,688 | B2 * | 3/2006 | Griffiths | B03C 3/14 | 55/DIG. 39 |
| 7,517,505 | B2 * | 4/2009 | Botvinnik | B03C 3/08 | 422/186.04 |
| 7,655,076 | B2 * | 2/2010 | Griffiths | B03C 3/011 | 96/64 |
| 8,349,052 | B2 * | 1/2013 | Noh | B03C 3/47 | 95/79 |
| 8,470,084 | B2 * | 6/2013 | Ji | B03C 3/64 | 313/355 |
| 8,580,017 | B2 * | 11/2013 | Noh | B03C 3/47 | 96/87 |
| 8,597,415 | B2 * | 12/2013 | Noh | B03C 3/12 | 96/60 |
| 8,690,996 | B2 * | 4/2014 | Ji | B03C 3/12 | 95/79 |
| 8,690,998 | B2 * | 4/2014 | Ji | B03C 3/41 | 96/87 |
| 10,537,901 | B2 * | 1/2020 | Lee | F24F 1/0083 | |
| 10,994,283 | B2 * | 5/2021 | Noh | B03C 3/12 | |
| 2004/0226448 | A1 * | 11/2004 | Griffiths | B03C 3/14 | 96/99 |
| 2005/0051420 | A1 * | 3/2005 | Botvinnik | B03C 3/47 | 422/186.04 |
| 2010/0089240 | A1 * | 4/2010 | Krichtafovitch | F24C 15/2035 | 96/95 |
| 2010/0147151 | A1 * | 6/2010 | Ji | B03C 3/47 | 96/86 |
| 2017/0354979 | A1 * | 12/2017 | Krichtafovitch | B03C 3/41 | |
| 2020/0023377 | A1 * | 1/2020 | Kochiyama | B03C 3/41 | |
| 2020/0376498 | A1 * | 12/2020 | Lee | B01D 46/0032 | |
| 2021/0023571 | A1 * | 1/2021 | Berthoud | B03C 3/47 | |
| 2023/0149948 | A1 * | 5/2023 | Shin | B03C 3/66 | 95/33 |

FOREIGN PATENT DOCUMENTS

| | | | |
|---|---|---|---|
| JP | 2010094635 | A * | 4/2010 |
| JP | 6055585 | B2 | 12/2016 |
| KR | 100495627 | B1 | 6/2005 |
| KR | 10-2012-0072862 | A | 7/2012 |
| KR | 10-2018-0090569 | A | 8/2018 |
| KR | 20180090563 | A * | 8/2018 |
| KR | 20180101844 | A * | 9/2018 |
| KR | 10-2019-0055906 | A | 5/2019 |

OTHER PUBLICATIONS

Office Action issued on Sep. 1, 2023 by the CIPO in the corresponding Patent Application No. 202080057443.8, with English translation.

* cited by examiner (a)

(b)

(a)

(b)

(a)

(b)

ELECTRIC PRECIPITATOR

CROSS REFERENCE TO RELATED APPLICATIONS

This application is a national phase under 35 U.S.C. § 371 of International Application No. PCT/KR2020/010744 filed on Aug. 13, 2020, which claims the benefit of priority from Korean Patent Application No. 10-2019-0099042 filed on Aug. 13, 2019. The entire contents of these applications are incorporated herein by reference in their entirety.

TECHNICAL FIELD

The present invention relates to an electric precipitator which adsorbs and filters fine dust included in air in an air conditioning device such as an air conditioner or an air cleaner, and more particularly, to an electric precipitator in which an electric charging part and a precipitating part to which a high voltage is applied may further increase precipitation efficiency without adversely affecting each other.

BACKGROUND ART

An electric precipitator is widely used in an air conditioning device, a humidistat or the like, of a building and a vehicle, and charges dust particles to have selected specific electric charges through a corona discharge phenomenon and then precipitates the dust particles by an electrical attractive force in a precipitating part.

As illustrated in FIGS. 1 and 2, the electric precipitator described above mainly includes an electric charging part 10 and a precipitating part 20. The electric charging part 10 includes an electric charging frame 11 formed to be penetrated in a direction in which dust is introduced and having a frame shape and an electric charging plate 12 fixed to the electric charging frame 11 and formed perpendicular to the direction in which the dust is introduced.

The electric charging plate 12 includes one or more electric charging holes 13 formed to be penetrated in a direction in which dust particles are introduced, and pins 14 applying a high voltage to the dust particles at positions corresponding to the electric charging holes 13 to allow the dust particles to have specific electric charges through a corona electric charging phenomenon between inner peripheral surfaces of the electric charging holes 13 and the pins 14.

The precipitating part 20 precipitates the dust particles having the specific electric charges through the electric charging in the electric charging part 10 as described above by an electrical attractive force using opposite electric charge characteristics.

In this case, a conventional electric precipitator is mounted in a limited space, such that an electric charging part and a precipitating part may be positioned adjacent to each other. In this case, an electric field of the precipitating part may affect the electric charging unit to deteriorate electric charging performance, which may cause a problem such as deterioration of entire precipitation performance. In addition, when the conventional electric precipitator operates for a long time, a surface of a high-pressure side precipitating plate of the precipitating part is electrically charged to significantly adversely affect the electric charging part. In particular, in a case of a vehicle, miniaturization of the vehicle is an important factor, and an electric precipitator capable of miniaturizing the vehicle while increasing precipitation performance has been further demanded.

RELATED ART DOCUMENT

Patent Document

KR 10-0495627 B1 (entitled "Electric precipitator using urethane filter" and published on Jun. 27, 2005)

DISCLOSURE

Technical Problem

An object of the present invention is to provide an electric precipitator which adsorbs and filters fine dust included in air in an air conditioning device such as an air conditioner or an air cleaner and in which an electric charging part and a precipitating part to which a high voltage is applied may further increase precipitation efficiency without adversely affecting each other.

In more detail, an object of the present invention is to provide an electric precipitator capable of increasing entire precipitation performance by solving a problem that an electric field formed by a precipitating part hinders the discharge of an electric charging part, such that ions are not generated and dust is not electrically charged to hinder the entire precipitation performance.

In particular, an object of the present invention is to provide an electric precipitator in which a first precipitating plate and a second precipitating plate may be variously formed, for example, the first precipitating plate and the second precipitating plate are spaced apart from each other by a predetermined distance and disposed side by side, each of the first precipitating plate and the second precipitating plate is formed in a spiral shape using a single member, and the first precipitating plate and the second precipitating plate are formed in the form of a plurality of concentric circles.

Technical Solution

In one general aspect, an electric precipitator 1000 includes: an electric charging part 100 receiving a first high voltage applied thereto and applying electric charges to dust; and a precipitating part 200 including first precipitating plates 210 to which a first low voltage having a lower level than the first high voltage is applied and second precipitating plates 220 to which a second high voltage having a higher level than the first low voltage is applied, in order to precipitate the dust charged in the electric charging part 100, wherein the electric charging part 100 is disposed to be farther spaced apart from the second precipitating plate 220 than the first precipitating plate 210 in a portion or entirety thereof.

In addition, the first precipitating plate 210 may include a first conductive pattern part **210*a* and a first dielectric 210*b* surrounding the periphery of the first conductive pattern part 210*a*, and the second precipitating plate 220 may include a second conductive pattern part 220*a* and a second dielectric 220*b* surrounding the periphery of the second conductive pattern part 220*a***.

In addition, in some or all of the second precipitating plates 220, a distance between the second conductive pattern part **220*a* and the electric charging part 100 may be greater than a distance between the first conductive pattern part 210*a* and the electric charging part 100**.

In another general aspect, an electric precipitator includes: an electric charging part 100 receiving a first high voltage applied thereto and applying electric charges to dust; and a precipitating part 200 precipitating the dust charged in the electric charging part 100, wherein the precipitating part 200 includes: first precipitating plates 210 each including a first conductive pattern part 210*a* to which a first low voltage having a lower level than the first high voltage is applied and a first dielectric 210*b* surrounding the periphery of the first conductive pattern part 210*a*; and second precipitating plates 220 each including a second conductive pattern part 220*a* to which a second high voltage having a higher level than the first low voltage is applied and a second dielectric 220*b* surrounding the periphery of the second conductive pattern part 220*a*, and the electric charging part 100 is disposed to be farther spaced apart from the second conductive pattern part 220*a* than the first conductive pattern part 210*a* in a portion or entirety thereof.

In addition, the electric charging part 100 may include a plate part in which a hollow region through which air passes is formed and to which a second low voltage having a lower level than the first high voltage is applied.

In this case, a distance between the electric charging part 100 and the first precipitating plate 210 of the electric precipitator may be 1 to 25 mm, and an interval d200 between the first precipitating plate 210 and the second precipitating plate 220 may be 5 mm or less.

Meanwhile, in the precipitating part 200, the first precipitating plates 210 may be spaced apart from each other by a predetermined distance in a length direction and disposed side by side, and the second precipitating plate 220 may be spaced apart from each other by a predetermined distance in the length direction and disposed side by side and may be disposed alternately with the first precipitating plates 210 while facing the first precipitating plates 210.

In this case, in the precipitating part 200, each of the first precipitating plate 210 and the second precipitating plate 220 may be formed by bending a single member.

In addition, the precipitating part 200 may include a first fixing member 230 including first supports 231 elongated in the length direction to fix positions of the first precipitating plates 210 and a second fixing member 240 including second supports 241 elongated in the length direction to fix positions of the second precipitating plates 220.

In addition, the first precipitating plate 210 may have first insertion grooves 212 which are formed at one side thereof in a width direction and into which the first supports 231 of the first fixing member 230 are inserted and fixed and have first cut-out grooves 213 which are formed at the other side thereof in the width direction and at which the second supports 241 of the second fixing member 240 are positioned, and the second precipitating plate 220 may have second cut-out grooves 223 which are formed at one side thereof in the width direction and at which the first supports 231 of the first fixing member 230 are positioned and have second insertion grooves 222 which are formed at the other side thereof in the width direction and into which the second supports 241 of the second fixing member 240 are inserted and fixed.

Meanwhile, in the precipitating part 200, the first precipitating plate 210 and the second precipitating plate 220 may be formed using single members, respectively, and may be spaced apart from each other by a predetermined distance and be formed in a spiral shape.

In addition, in the precipitating part 200, the first precipitating plates 210 and the second precipitating plates 220 may be alternately disposed to be spaced apart from each other by a predetermined distance in the form of a plurality of concentric circles.

Advantageous Effects

Accordingly, in the electric precipitator according to the present invention, which is an electric precipitator that adsorbs and filters fine dust included in air in an air conditioning device such as an air conditioner or an air cleaner, an electric charging part and a precipitating part to which a high voltage is applied may further increase precipitation efficiency without adversely affecting each other.

In more detail, the electric precipitator according to the present invention may increase entire precipitation performance by solving a problem that an electric field formed by a precipitating part hinders the discharge of an electric charging part, such that ions are not generated and dust is not electrically charged to hinder the entire precipitation performance.

In particular, in the electric precipitator according to the present invention, a first precipitating plate and a second precipitating plate may be variously formed, for example, the first precipitating plate and the second precipitating plate are spaced apart from each other by a predetermined distance and disposed side by side, each of the first precipitating plate and the second precipitating plate is formed in a spiral shape using a single member, and the first precipitating plate and the second precipitating plate are formed in the form of a plurality of concentric circles.

BEST MODE

Hereinafter, an electric participator 1000 according to the present invention having the feature as described above will be described in detail with reference to the accompanying drawings.

Figure 1:
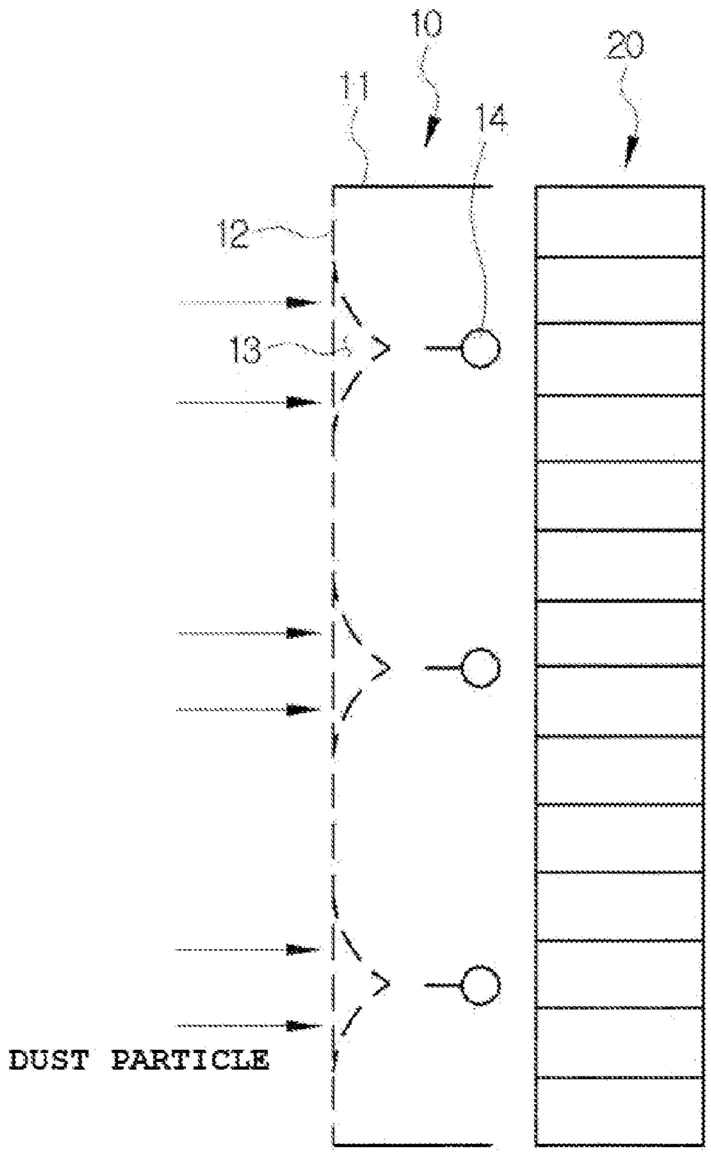
FIGS. 1 and 2 are, respectively, a plan view and a partial cross-sectional view illustrating a precipitating part of a conventional electric precipitator.
Figure 2:
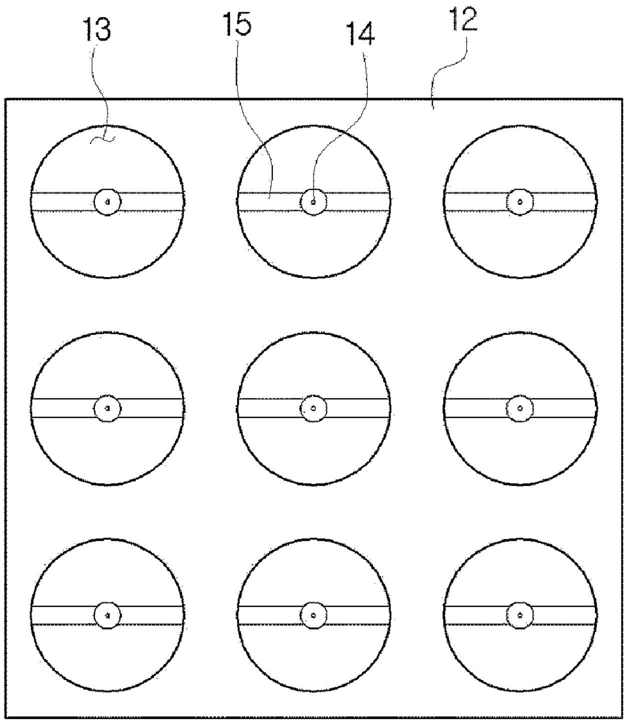
Figure 3:
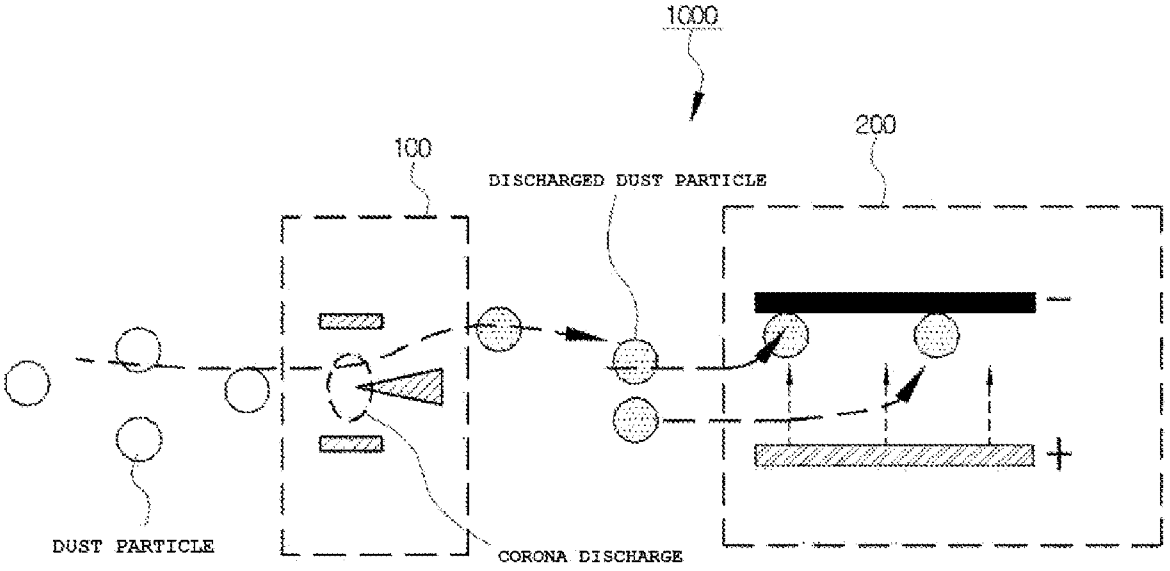
FIGS. 3 and 4 are schematic views illustrating an electric precipitator according to the present invention.
Figure 4:
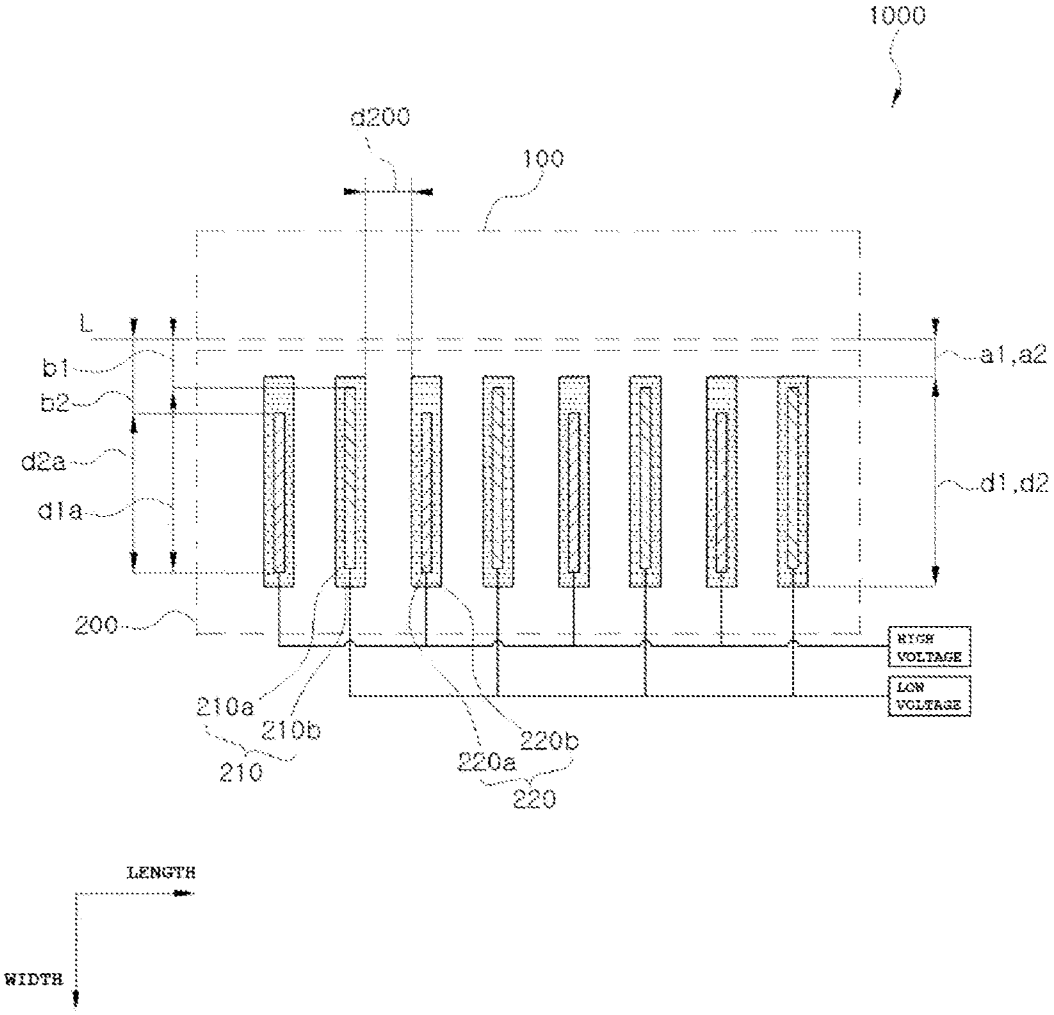
Figure 5:
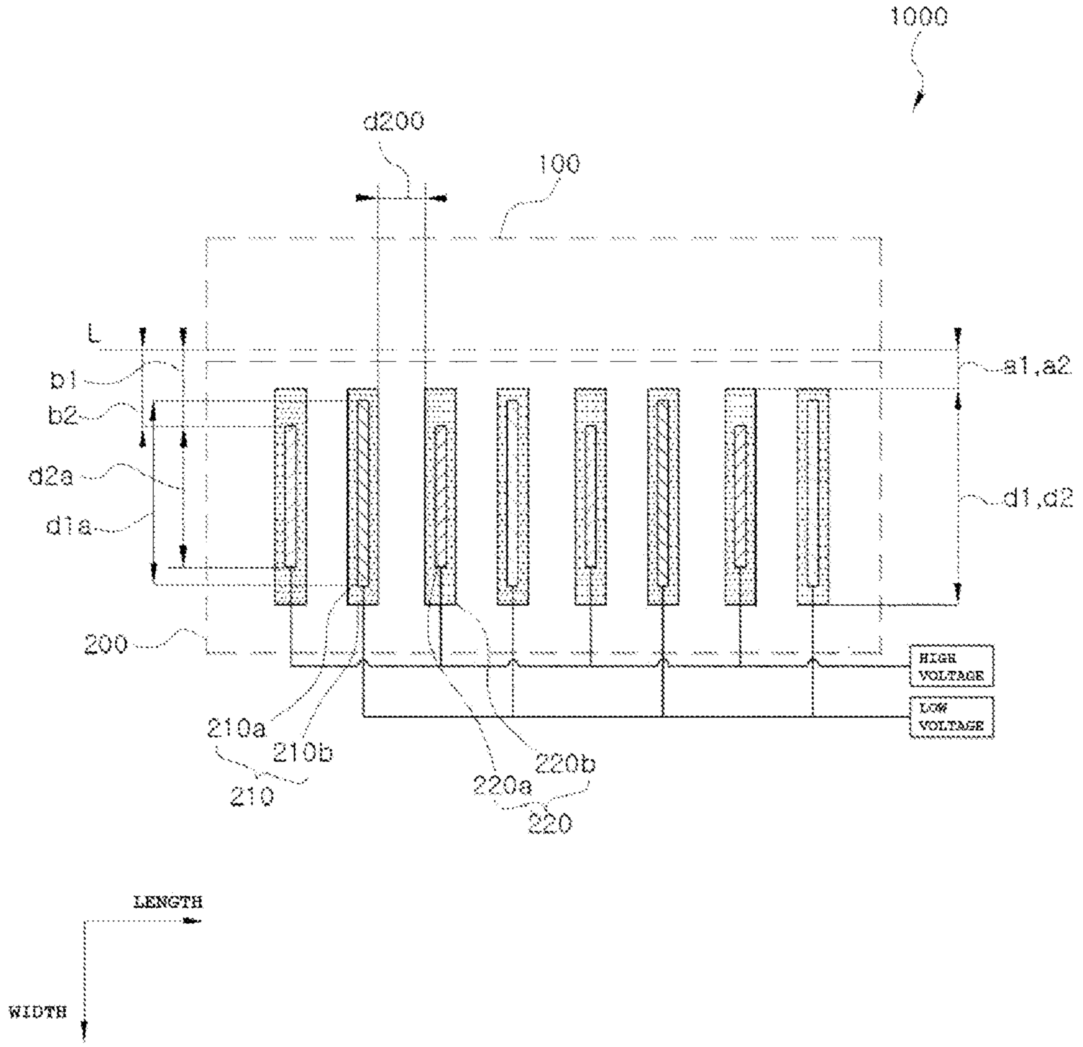
FIG. 5 is another schematic view illustrating an electric precipitator according to the present invention.
Figure 6:
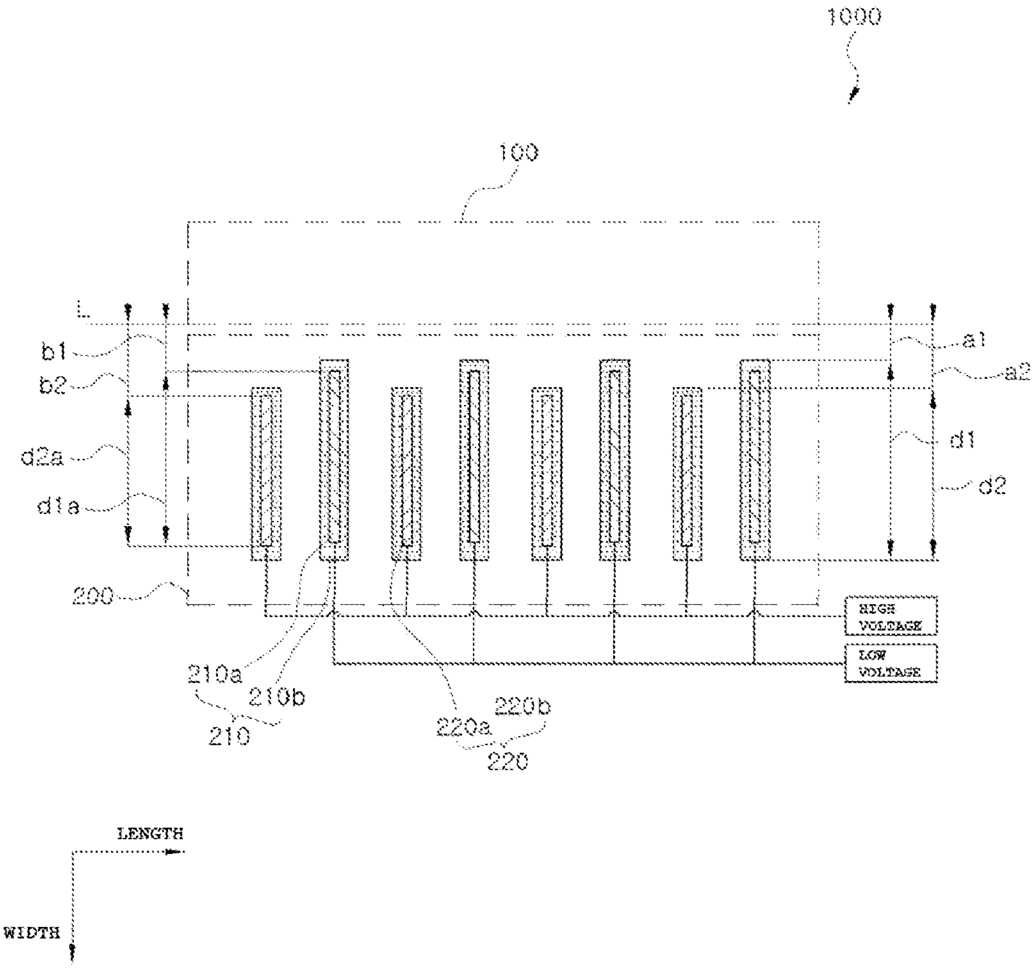
FIG. 6 is a schematic view illustrating another example of a precipitating part according to the present invention.
Figure 7:
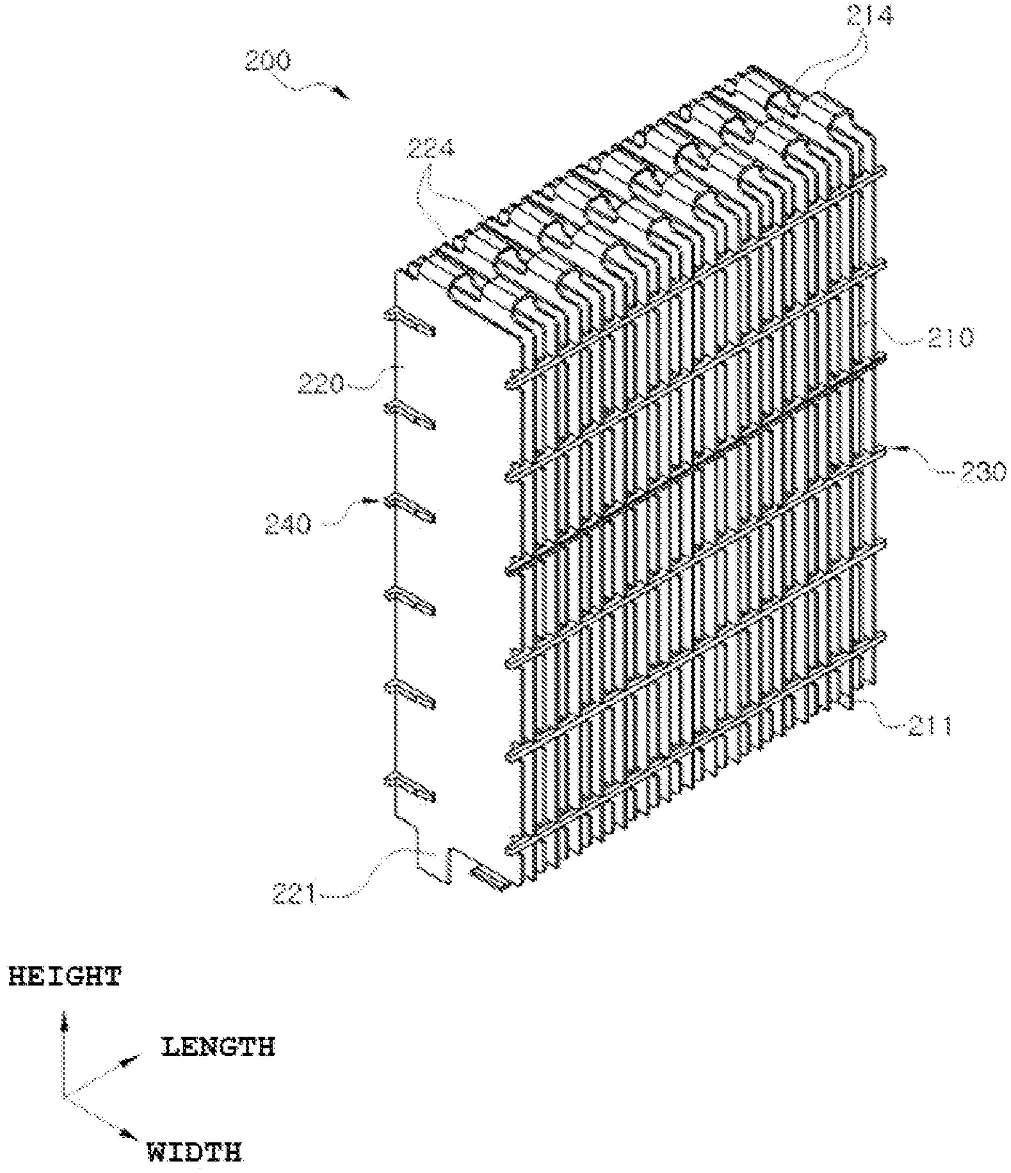
FIGS. 7 and 8 are, respectively, a perspective view and an exploded perspective view illustrating an example of the precipitating part according to the present invention.
Figure 8:
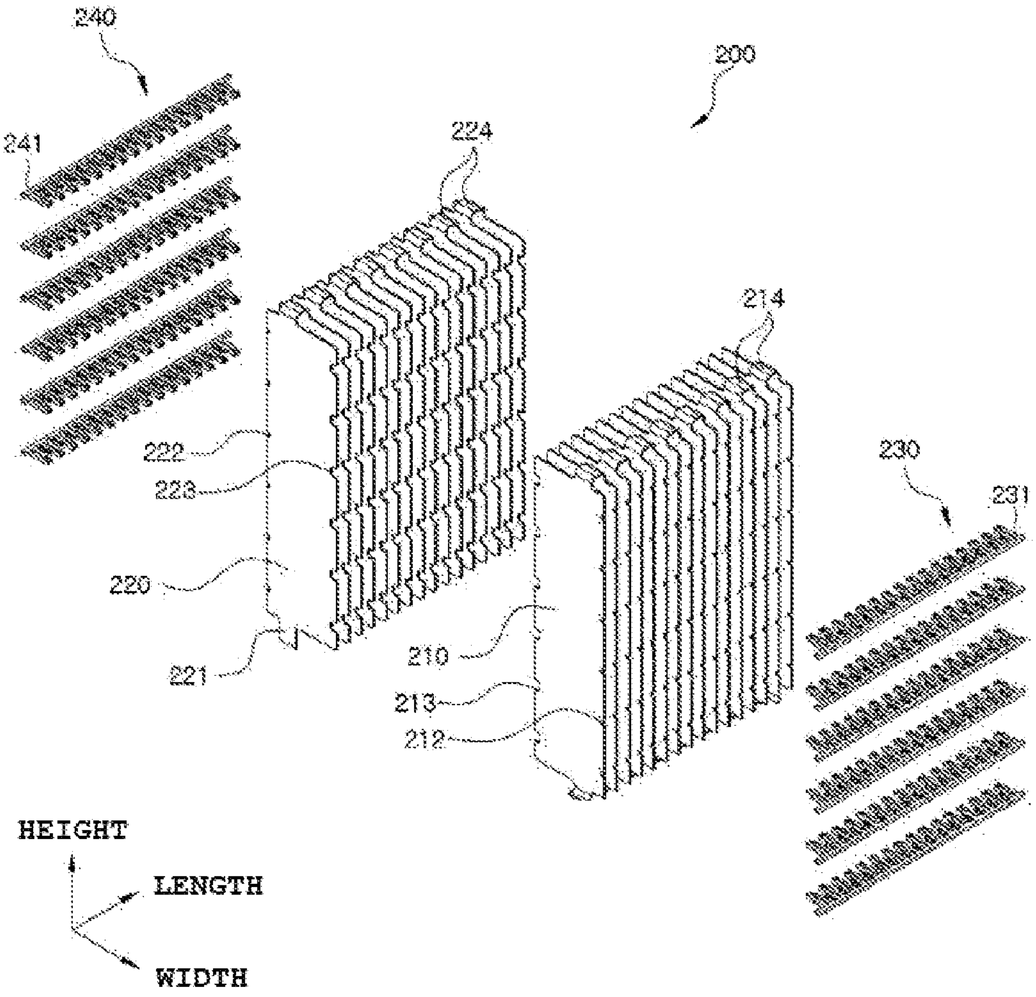
Figure 9:
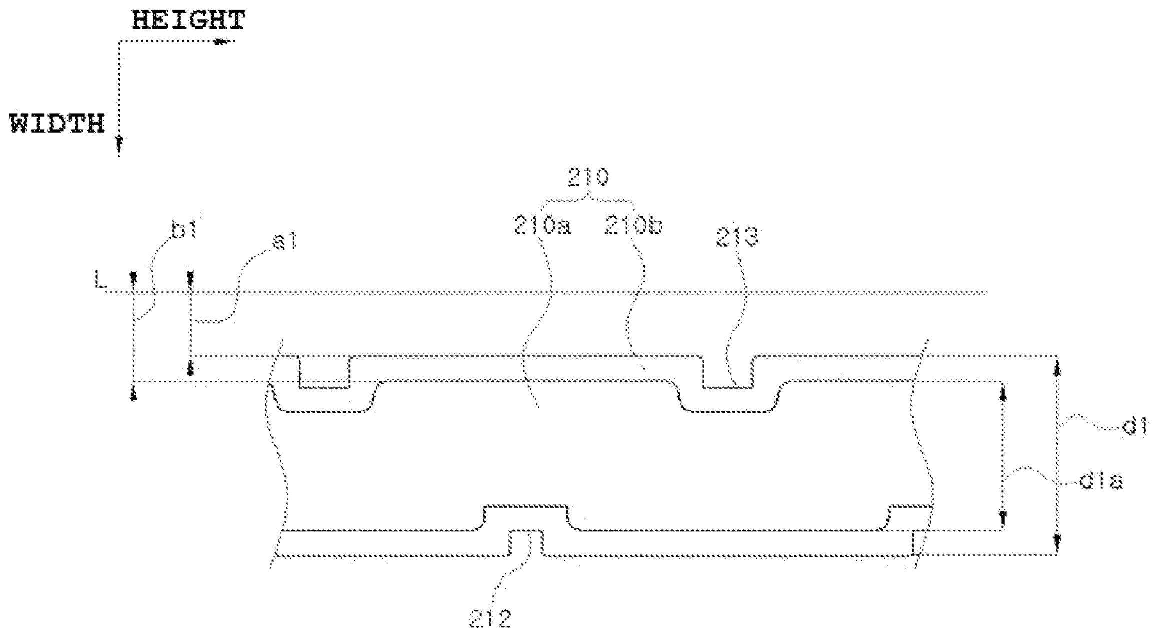
FIGS. 9 and 10 are, respectively, partial development views of members forming a first precipitating plate and a second precipitating plate of the precipitating part according to the present invention.
Figure 9:
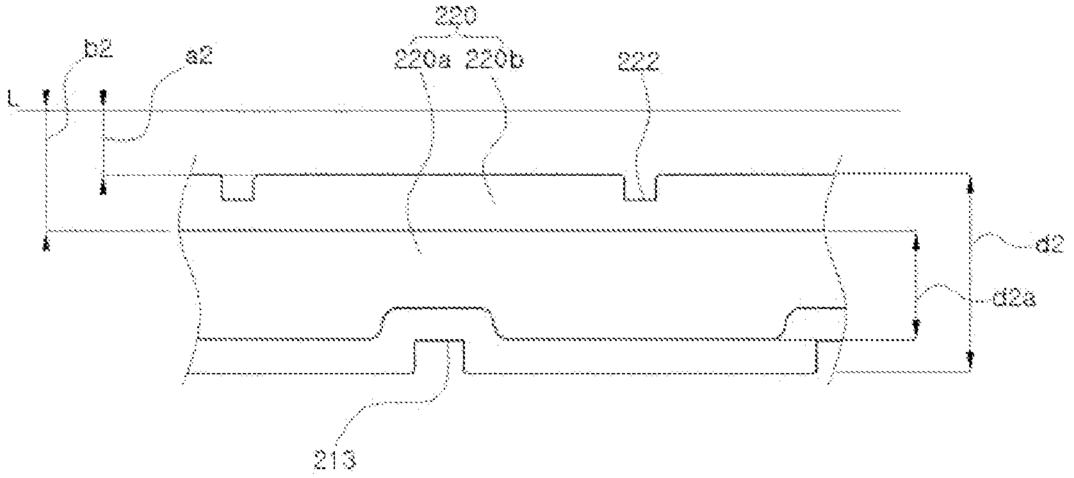
Figure 10:
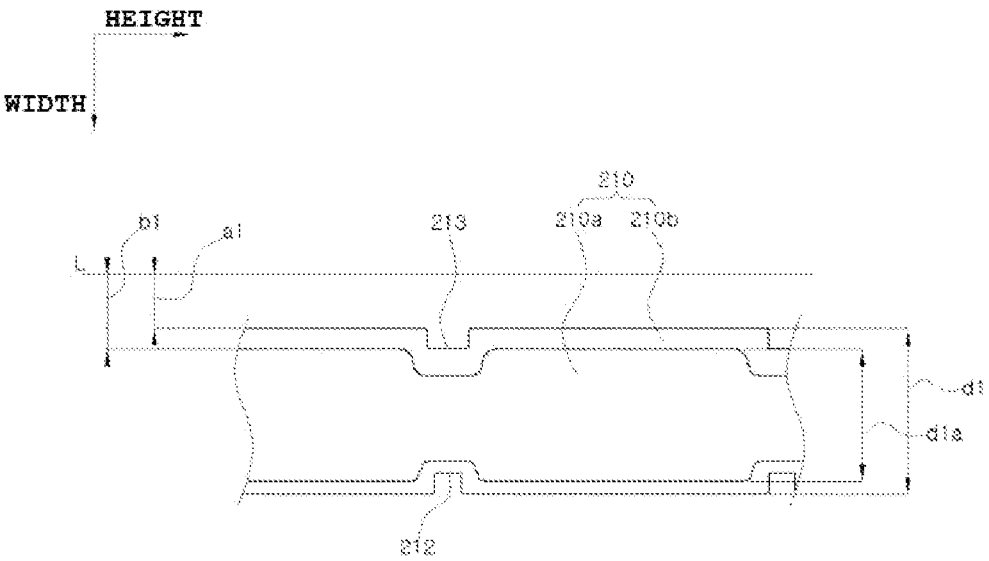
Figure 10:
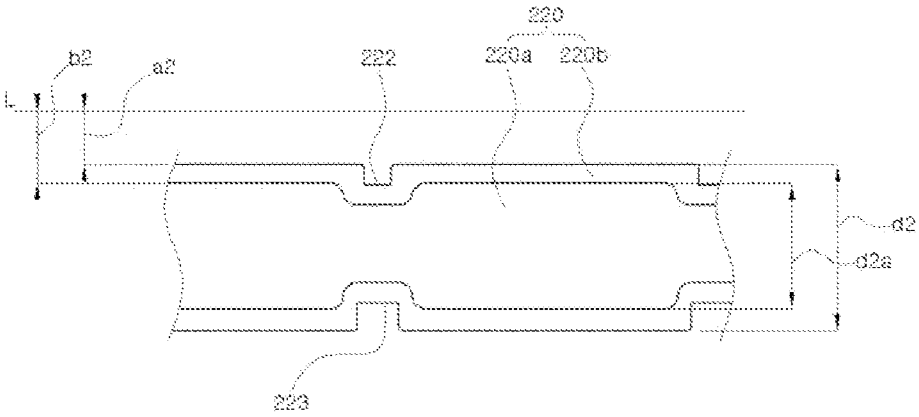
Figure 11:
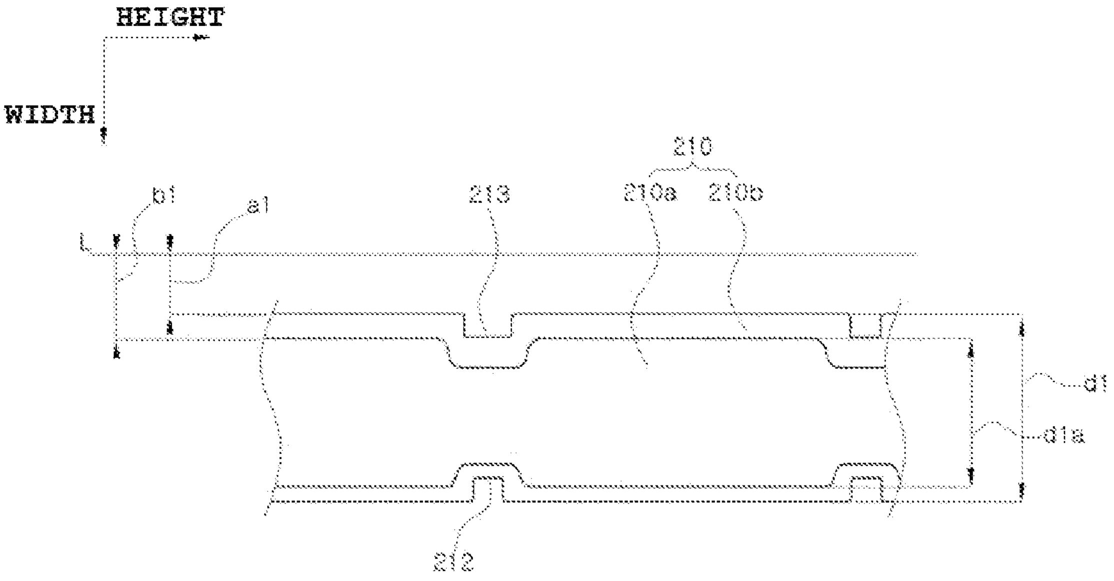
FIG. 11 is a partial development view of members forming a first precipitating plate and a second precipitating plate of the precipitating part illustrated in FIG. 6.
Figure 11:
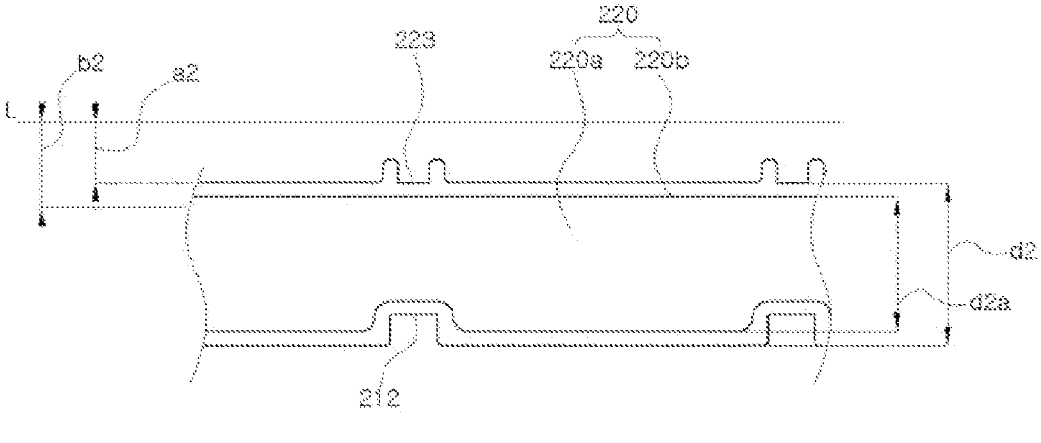
Figure 12:
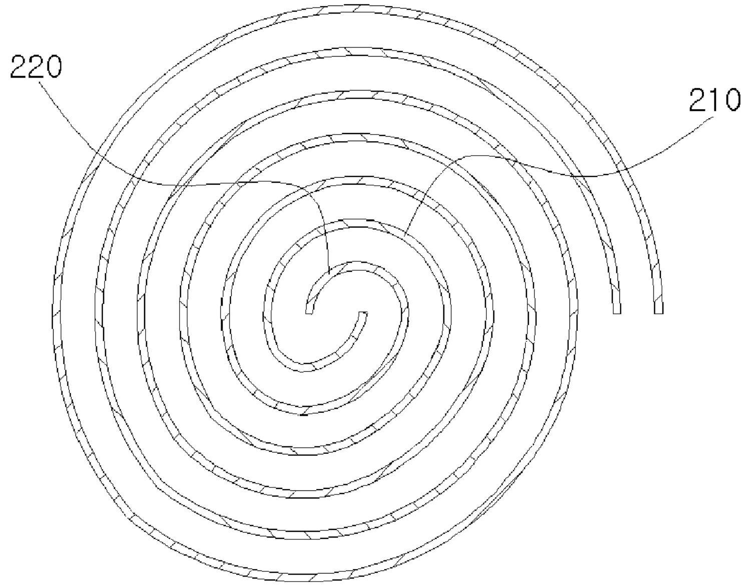
FIGS. 12 and 13 are views illustrating another example of the precipitating part according to the present invention.
Figure 13:
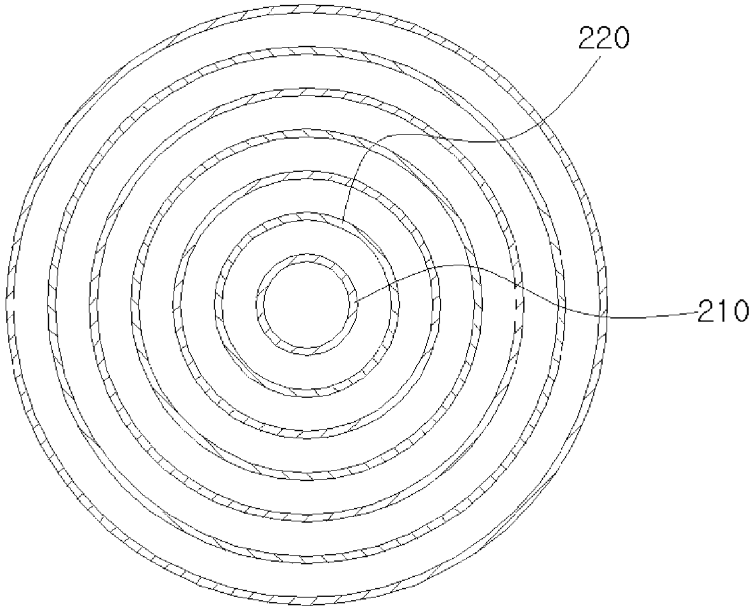

FIGS. 3 and 4 are schematic views illustrating an electric precipitator 1000 according to the present invention, FIG. 5 is another schematic view illustrating an electric precipitator 1000 according to the present invention, FIG. 6 is a schematic view illustrating another example of a precipitating part 200 according to the present invention, FIGS. 7 and 8 are, respectively, a perspective view and an exploded perspective view illustrating an example of the precipitating part 200 according to the present invention, FIGS. 9 and 10 are, respectively, partial development views of members forming a first precipitating plate 210 and a second precipitating plate 220 of the precipitating part 200 according to the present invention, FIG. 11 is a partial development view of members forming a first precipitating plate 210 and a second precipitating plate 220 of the precipitating part 200 illustrated in FIG. 6, and FIGS. 12 and 13 are views illustrating another example of the precipitating part 200 according to the present invention.

The electric precipitator 1000 according to the present invention includes an electric charging part 100 and a precipitating part 200, and air sequentially passes through the electric charging part 100 and the precipitating part 200.

First, the electric charging part 100 receives a first high voltage applied thereto and applies electric charges to dust introduced from the outside to electrically charge the dust through a corona electric charging phenomenon, thereby allowing dust particles to have selected electric charge characteristics. The electric precipitator 1000 according to the present invention may be used in various forms in which the electric charging part 100 receives a voltage applied thereto and applies electric charges to dust particles.

The precipitating part 200 includes first precipitating plates 210 and second precipitating plates 220. A first low voltage having a lower level than the first high voltage of the electric charging part is applied to the first precipitating plates 210 and a second high voltage having a higher level than the first low voltage is applied to the second precipitating plates 220, such that the first precipitating plates 210 and the second precipitating plates 220 precipitate the dust particles electrically charged in the precipitating part 200.

The first precipitating plate 210 is in the form of a film including a first conductive pattern part 210*a* and a first dielectric 210*b* surrounding the periphery of the first conductive pattern part 210*a*, and the second precipitating plate 220 has a structure similar to that of the first precipitating plate 210 and is in the form of a film including a second conductive pattern part 220*a* and a second dielectric 220*b* surrounding the periphery of the second conductive pattern part 220*a*.

The first conductive pattern part 210*a* and the second conductive pattern part 220*a* may be formed of various electrically conductive materials such as a carbon sheet, and the first dielectric 210*b* and the second dielectric 220*b* may be formed of plastic or the like.

The first precipitating plate 210 and the second precipitating plate 220 may be variously formed, which will be described again below. Meanwhile, at an end portion of the first precipitating plate 210, the first conductive pattern part 210*a* may have a portion that is not surrounded by the first dielectric 210*b* and is exposed to the outside, and such a portion forms a first electrode tab 211 to which a power supply of a low voltage is to be connected. In addition, at an end portion of the second precipitating plate 220, the second conductive pattern part 220*a* may have a portion that is not surrounded by the second dielectric 220*b* and is exposed to the outside, and such a portion forms a second electrode tab 221 to which a power supply of a high voltage is to be connected.

Meanwhile, the electric charging part 100 includes a plate part (not illustrated) in which a hollow region through which air passes is formed and to which a second low voltage having a lower level than the first high voltage is applied, together with a component to which a first high voltage is applied. In this case, the component to which the first high voltage is applied may have a pin shape protruding toward the center of the hollow region of the plate part.

The electric precipitator 1000 according to the present invention may be effectively applied in a case where the precipitating part 200 and the electric charging part 100 are positioned adjacent to each other, and may be applied in a case where a distance between the electric charging part 100 and the first precipitating plate 210 is 1 to 25 mm, thereby minimizing an effect of an electric field of the precipitating part 200 on the electric charging part 100. The distance between the electric charging part 100 and the first precipitating plate 210 should be equal to greater than 1 mm, which is a minimum spacing distance, and in a case where distance between the electric charging part 100 and the first precipitating plate 210 exceeds 25 mm, an effect of the electric field of the precipitating part 200 on the electric charging part 100 is decreased. That is, in a case that the electric charging part 100 and the first precipitating plate 210 are provided adjacent to each other at a distance of 25 mm or less, the electric precipitator 1000 according to the present invention minimizes the effect of the electric field of the precipitating part 200 on the electric charging part 100.

In this case, in the electric precipitator 1000 according to the present invention, as illustrated in FIG. 4, in some or all of the second precipitating plates 220, a distance between the second conductive pattern part 220*a* and the electric charging part 100 may be greater than a distance between the first conductive pattern part 210*a* and the electric charging part 100. In FIG. 4, a reference line L, which is an end portion of the electric charging part 100 adjacent to the precipitating part 200, is denoted by a reference numeral L. That is, in the electric precipitator 1000 according to the present invention, a length d1 of the first precipitating plate 210 in a width direction and a length d2 of the second precipitating plate 220 in the width direction are the same as each other (d1=d2), but a distance b2 between the second conductive pattern part 220*a* of the second precipitating plate 220 to which a high voltage is applied and the electric charging part 100 is greater than a distance b1 between the first conductive pattern part 210*a* of the first precipitating plate 210 and the electric charging part 100 (b2>b1), and a length d2*a* of the second conductive pattern part 220*a* in the width direction is smaller than a length d1*a* of the first conductive pattern part 210*a* in the width direction (d2*a*<d1*a*). Since the length d1 of the first precipitating plate 210 in the width direction and the length d2 of the second precipitating plate 220 in the width direction are the same as each other (d1=d2), a distance between the electric charging part 100 and the first precipitating plate 210 and a distance between the electric charging part 100 and the second precipitating plate 220 are the same as each other (a1=a2). The electric precipitator 1000 according to the present invention illustrated in FIG. 4 may solve a problem that an electric field formed by the precipitating part 200 hinders the discharge of the electric charging part 100, such that ions are not generated and dust is not electrically charged to hinder entire precipitation performance, by adjusting regions in which the first conductive pattern part 210*a* and the second conductive pattern part 220*a* are formed without changing external forms of the first precipitating plate 210 and the second precipitating plate 220.

In addition, in the precipitating part 200, it is preferable that an interval d200 between the first precipitating plate 210 and the second precipitating plate 220 is 5 mm or less. In a case where the interval d200 between the first precipitating plate 210 and the second precipitating plate 220 exceeds 5 mm, a region of the second precipitating plate 220 exposed toward the electric charging part 100 is large, such that the electric charging part 100 is greatly affected by the electric field of the precipitating part 200, and thus, precipitation performance may be deteriorated. Accordingly, in the electric precipitator 1000 according to the present invention, it is preferable that the interval d200 between the first precipitating plate 210 and the second precipitating plate 220 is 5 mm or less to minimize that the electric field formed by the precipitating part 200 hinders the discharge of the electric charging part 100.

As another form, an example in which the electric precipitator 1000 according to the present invention has the same form as that illustrated in FIG. 4, but the length d2*a* of the second conductive pattern part 220*a* in the width direction is smaller than that in the form illustrated in FIG. 4 is illustrated in FIG. 5.

As another form, an example in which the electric precipitator 1000 according to the present invention has the same form as that illustrated in FIG. 4, but the distance a2 between the second precipitating plate 220 and the electric charging part 100 is greater than the distance a1 between the first precipitating plate 210 and the electric charging part 100 (a1<a2) is illustrated in FIG. 6. That is, in the form illustrated in FIG. 6, the length d2 of the second precipitating plate 220 in the width direction is smaller than the length d1 of the first precipitating plate 210 in the width direction (d1>d2).

That is, the electric precipitator 1000 according to the present invention may decrease that the electric field of the precipitating part 200 hinders the discharge of the electric charging part 100 by adjusting a form of the second precipitating plate 220 to which the high voltage is applied, more specifically, the length d2 of the second precipitating plate 220 and/or the length d2*a* of the second conductive pattern part 220*a*.

In the electric precipitator 1000 according to the present invention, each of the first precipitating plate 210 and the second precipitating plate 220 may be formed by bending a single member, and in this case, each of the first precipitating plate 210 and the second precipitating plate 220 may have various forms.

First, as illustrated in FIGS. 7 and 8, the electric precipitator 1000 according to the present invention may have a form in which the first precipitating plates 210 are spaced apart from each other by a predetermined distance in a length direction and disposed side by side, and the second precipitating plate 220 are spaced apart from each other by a predetermined distance in the length direction and disposed side by side and are disposed alternately with the first precipitating plates 210 while facing the first precipitating plates 210. That is, a member forming the first precipitating plates 210 has a form in which a plurality of first precipitating plates 210 are provided in the length direction and both ends of neighboring first precipitating plates 210 in a height direction are alternately connected to each other by first connection parts 214, and is bent so that ridges and valleys are repeated. In addition, similar to the first precipitating plates 210, a member forming the second precipitating plates 220 has a form in which both ends of neighboring second precipitating plates 220 in the height direction are alternately connected to each other by second connection parts 224, and is bent so that ridges and valleys are repeated. In this case, the first precipitating plates 210 and the second precipitating plates 220 are alternately positioned in the length direction.

In addition, the precipitating part 200 includes a first fixing member 230 including first supports 231 elongated in the length direction to fix positions of the first precipitating plates 210 and a second fixing member 240 including second supports 241 elongated in the length direction to fix positions of the second precipitating plates 220.

The first fixing member 230 includes the first supports 231 supporting one sides of the first precipitating plates 210 and portions extending the first supports 231 to fix the first precipitating plates 210, in the length direction in which the first precipitating plate 210 and the second precipitating plate 220 are spaced apart from each other and are positioned side by side.

In addition, the second fixing member 240 includes the second supports 241 supporting one sides of the second precipitating plates 220 and portions extending the second supports 241 to fix the second precipitating plates 220, in the length direction.

In this case, the first precipitating plate 210 has first insertion grooves 212 which are formed at one side thereof in the width direction and into which the first supports 231 of the first fixing member 230 are inserted and fixed and has first cut-out grooves 213 which are formed at the other side thereof in the width direction and at which the second supports 241 of the second fixing member 240 are positioned. That is, the first insertion groove 212 is a portion formed to have a size corresponding to a size of the first support 231 and formed to be concave so that the first support 231 is inserted and fixed thereinto, and the first cut-out groove 213 is formed so that the second supporter 241 is inserted thereinto, but is formed to be larger than the second supporter 241 so as to prevent electrical connection and is formed to have a size at which it includes a spaced portion between the first cut-out groove 213 and the second supporter 241.

In addition, the second precipitating plate 220 has second cut-out grooves 223 which are formed at one side thereof in the width direction and at which the first supports 231 of the first fixing member 230 are positioned and has second insertion grooves 222 which are formed at the other side thereof in the width direction and into which the second supports 241 of the second fixing member 240 are inserted and fixed. That is, the second insertion groove 222 is a portion formed to have a size corresponding to a size of the second support 241 and formed to be concave so that the second support 241 is inserted and fixed thereinto, and the second cut-out groove 223 is formed so that the first supporter 231 is inserted thereinto, but is formed to be larger than the first supporter 231 so as to prevent electrical connection and is formed to have a size at which it includes a spaced portion between the second cut-out groove 223 and the first supporter 231.

In this case, the first inserting grooves 212 and the first cut-out grooves 213 are formed in a region in which the first dielectric 210*b* is formed in the first precipitating plate 210, and the second inserting grooves 222 and the second cut-out grooves 223 are formed in a region in which the second dielectric 220*b* is formed in the second precipitating plate 220.

The respective member for forming the first precipitating plate 210 and the second precipitating plate 220 illustrated in FIGS. 7 and 8 are illustrated in FIGS. 9 to 11.

First, FIGS. 9A, 10A, and 11A illustrate members for forming the first precipitating plate 210, and FIGS. 9B, 10B, and 11B illustrate members for forming the second precipitating plate 220.

In a form illustrated in FIGS. 9 and 10, as in the form illustrated in FIG. 5, an example in which the lengths of the first precipitating plate 210 and the second precipitating plate 220 are the same as each other (d1=d2), such that the distance a1 between the electric charging part 100 and the first precipitating plate 210 and the distance a2 between the electric charging part 100 and the second precipitating plate 220 are the same as each other (a1=a2), but the distance b2 between the second conductive pattern part 220*a* and the electric charging part 100 is greater than the distance b1 between the first conductive pattern part 210*a* and the electric charging part 100 (b1<b2), and the second conductive pattern part 220*a* is formed to be positioned within a region of the first conductive pattern part 210*a* in the width direction is illustrated. In FIG. 9, a criterion for setting the distances of the first conductive pattern part 210*a* and the second conductive pattern part 220*a* in the width direction is a portion in which the first insertion groove 212, the first cut-out groove 213, the second insertion groove 222 and the second cut-out groove 223 are not formed. In the form illustrated in FIG. 9, it was confirmed that a discharge current is 55.8 μA and precipitation performance is 76%, which is high. In addition, in the form illustrated in FIG. 10, it was confirmed that a discharge current is 46.4 μA and precipitation performance is 81%, which is high.

In this case, FIG. 9 illustrates a case where the first fixing member 230 and the second fixing member 240 are alternately positioned in the height direction, and FIG. 10 illustrates a case where the first fixing member 230 and the second fixing member 240 are positioned in the same region in the height direction.

A form illustrated in FIG. 11 is an example in which the distance a2 between the electric charging part 100 and the second precipitating plate 220 is greater than the distance a1 between the electric charging part 100 and the first precipitating plate 210 (a1<a2) and the lengths d1 and d2 of the first precipitating plate 210 and the second precipitating plate 220 are different from each other, and an example in which the distance b2 between the second conductive pattern part 220*a* and the electric charging part 100 is also greater than the distance b1 between the first conductive pattern part 210*a* and the electric charging part 100 (b1<b2) is illustrated. In this case, an example in which the length d2 of the second precipitating plate 220 in the width direction is smaller than the length d1 of the first precipitating plate 210 in the width direction (d1>d2), such that a portion for forming the second insertion groove 222 is formed to protrude upward in FIG. 11 is illustrated. In this case, in the form illustrated in FIG. 11, it was confirmed that a discharge current is 64.1 μA and precipitation performance is 81%, which is high.

Meanwhile, in the electric precipitator 1000 according to the present invention, as illustrated in FIG. 12, the first precipitating plate 210 and the second precipitating plate 220 may be formed using single members, respectively, and may be spaced apart from each other by a predetermined distance and be formed in a spiral shape.

In addition, in the electric precipitator 1000 according to the present invention, as illustrated in FIG. 13, the first precipitating plates 210 and the second precipitating plates 220 may be formed using respective circular members. In this case, the respectively first precipitating plates 210 and second precipitating plates 220 may be alternately disposed to be spaced apart from each other by a predetermined distance, and all of the first precipitating plates 210 and second precipitating plates 220 may have the form of concentric circles.

In the electric precipitator 1000 according to the present invention, the first conductive pattern part 210*a* and the second conductive pattern part 220*a* effectively perform dust precipitation, and a form of the second precipitating plate 220 to which the high voltage is applied may be adjusted so as to minimize an adverse effect on the electric charging part 100, which may be performed by variously adjusting the length d2 of the second precipitating plate 220 in the width direction, a region in which the second conductive pattern part 220*a* is formed, and the like.

The present invention is not limited to the embodiments described above, and may be applied to various fields. In addition, the present invention may be variously modified by those skilled in the art to which the present invention pertains without departing from the gist of the present invention claimed in the claims.

[Detailed Description of Main Elements]

| | |
|---|---|
| 1000: electric precipitator | |
| 100: electric charging part | |
| 200: precipitating part | |
| 210: first precipitating plate | |
| 210a: first conductive pattern part | 210b: first dielectric |
| 211: first electrode tab | |
| 212: first insertion groove | 213: first cut-out groove |
| 214: first connection part | |
| 220: second precipitating plate | |
| 220a: second conductive pattern part | 220b: second dielectric |
| 221: second electrode tab | |
| 222: second insertion groove | 223: second cut-out groove |
| 224: second connection part | |
| 230: first fixing member | 231: first support |
| 240: second fixing member | 241: second support |

L: reference line (one side of electric charging part adjacent to precipitating part in width direction which is air moving direction) (based on air moving direction and width direction)

a1: distance between electric charging part and first precipitating plate a2: distance between electric charging part and second precipitating plate b1: distance between electric charging part and first conductive pattern part b2: distance between electric charging part and second conductive pattern part d1: length of first precipitating plate in width direction d1*a*: length of first conductive pattern part in width direction d2: length of second precipitating plate in width direction d2*a*: length of second conductive pattern part in width direction d200: interval between first precipitating plate and second precipitating plate (in length direction)

The invention claimed is:

1. An electric precipitator comprising:

an electric charging part receiving a first high voltage applied thereto and applying electric charges to dust; and a precipitating part including first precipitating plates to which a first low voltage having a lower level than the first high voltage is applied and second precipitating plates to which a second high voltage having a higher level than the first low voltage is applied, in order to precipitate the dust charged in the electric charging part, wherein the electric charging part is disposed to be farther spaced apart from the second precipitating plates than the first precipitating plates in a portion or entirety thereof, wherein the precipitating part includes a first fixing member including first supports elongated in the length direction to fix positions of the first precipitating plates, wherein the precipitating part includes a second fixing member including second supports elongated in the length direction to fix positions of the second precipitating plates, wherein the first precipitating plates has first insertion grooves which are formed at one side thereof in a width direction and into which the first supports of the first fixing member are inserted and fixed and has first cut-out grooves which are formed at the other side thereof in the width direction and at which the second supports of the second fixing member are positioned, and the second precipitating plates has second cut-out grooves which are formed at one side thereof in the width direction and at which the first supports of the first fixing member are positioned and has second insertion grooves which are formed at the other side thereof in the width direction and into which the second supports of the second fixing member are inserted and fixed, wherein the first insertion grooves are formed in a size corresponding to the first supports, so that the first supports are inserted and fixed in the first insertion grooves, the first cut-out grooves are formed larger than the second supports to prevent electrical connection while the second supports are inserted, so that the second supports and the first cut-out grooves are spaced apart from each other, the second insertion grooves are formed in a size corresponding to the second supports, so that the second supports are inserted and fixed in the second insertion grooves, and the second cut-out grooves are formed larger than the first supports to prevent electrical connection while the first supports are inserted, so that the first supports and the second cut-out grooves are spaced apart from each other.

2. The electric precipitator of claim 1, wherein the first precipitating plates includes a first conductive pattern part and a first dielectric surrounding the periphery of the first conductive pattern part, and the second precipitating plates includes a second conductive pattern part and a second dielectric surrounding the periphery of the second conductive pattern part.

3. The electric precipitator of claim 2, wherein in some or all of the second precipitating plates, a distance between the second conductive pattern part and the electric charging part is greater than a distance between the first conductive pattern part and the electric charging part.

4. The electric precipitator of claim 3, wherein the electric charging part includes a plate part in which a hollow region through which air passes is formed and to which a second low voltage having a lower level than the first high voltage is applied.

5. An electric precipitator comprising:

an electric charging part receiving a first high voltage applied thereto and applying electric charges to dust; and a precipitating part precipitating the dust charged in the electric charging part, wherein the precipitating part includes:

first precipitating plates each including a first conductive pattern part to which a first low voltage having a lower level than the first high voltage is applied and a first dielectric surrounding the periphery of the first conductive pattern part; and second precipitating plates each including a second conductive pattern part to which a second high voltage having a higher level than the first low voltage is applied and a second dielectric surrounding the periphery of the second conductive pattern part, and wherein a distance between the electric charging part and the first precipitating plates and a distance between the electric charging part and the second precipitating plates are the same as each other (a1=a2), wherein a length d1 of the first precipitating plates in a width direction and a length d2 of the second precipitating plates in the width direction are the same as each other (d1=d2), the electric charging part is disposed to be further spaced apart from the second conductive pattern part than the first conductive pattern part in a portion or entirety thereof, wherein a distance b2 between the second conductive pattern part of the second precipitating plates to which a high voltage is applied and the electric charging part is greater than a distance b1 between the first conductive pattern part of the first precipitating plates and the electric charging part (b2>b1).

6. The electric precipitator of claim 5, wherein the electric charging part includes a plate part in which a hollow region through which air passes is formed and to which a second low voltage having a lower level than the first high voltage is applied.

7. The electric precipitator of claim 1, wherein a distance between the electric charging part and the first precipitating plates of the electric precipitator is 1 to 25 mm.

8. The electric precipitator of claim 7, wherein in the precipitating part, an interval d200 between the first precipitating plates and the second precipitating plates is 5 mm or less.

9. The electric precipitator of claim 1, wherein in the participating part, the first precipitating plates are spaced apart from each other by a predetermined distance in a length direction and disposed side by side, and the second precipitating plates are spaced apart from each other by a predetermined distance in the length direction and disposed side by side and are disposed alternately with the first precipitating plates while facing the first precipitating plates.

10. The electric precipitator of claim 9, wherein in the precipitating part, each of the first precipitating plates and the second precipitating plates is formed by bending a single member.

11. The electric precipitator of claim 1, wherein in the precipitating part, the first precipitating plates and the second precipitating plates are formed using single members, respectively, and are spaced apart from each other by a predetermined distance and are formed in a spiral shape.

12. The electric precipitator of claim 1, wherein in the precipitating part, the first precipitating plates and the second precipitating plates are alternately disposed to be spaced apart from each other by a predetermined distance in the form of a plurality of concentric circles.

* * * * *